(12) United States Patent
Wang et al.

(10) Patent No.: US 12,627,612 B2
(45) Date of Patent: May 12, 2026

(54) RAN ENHANCEMENT TAKING INTO ACCOUNT THE CBS BEHAVIOUR IN TSC

(71) Applicant: Nokia Technologies Oy, Espoo (FI)

(72) Inventors: Yonggang Wang, Shanghai (CN); Hua Chao, Shanghai (CN); Zexian Li, Espoo (FI); Guillermo Pocovi, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 92 days.

(21) Appl. No.: 18/702,046

(22) PCT Filed: Oct. 22, 2021

(86) PCT No.: PCT/CN2021/125568
§ 371 (c)(1),
(2) Date: Apr. 17, 2024

(87) PCT Pub. No.: WO2023/065283
PCT Pub. Date: Apr. 27, 2023

(65) Prior Publication Data
US 2025/0202833 A1     Jun. 19, 2025

(51) Int. Cl.
*H04L 47/10*          (2022.01)
*H04L 43/02*          (2022.01)
*H04L 47/56*          (2022.01)
(52) U.S. Cl.
CPC .............. *H04L 47/39* (2013.01); *H04L 43/02* (2013.01); *H04L 47/568* (2013.01)

(58) Field of Classification Search
None
See application file for complete search history.

(56) References Cited

U.S. PATENT DOCUMENTS

| | | | | |
|---|---|---|---|---|
| 8,174,977 B2 * | 5/2012 | Brownell | ................ | H04L 47/39 370/231 |
| 2003/0174650 A1 * | 9/2003 | Shankar | .................. | H04L 47/20 370/235 |
| 2003/0198204 A1 * | 10/2003 | Taneja | .................... | H04L 47/29 370/332 |
| 2006/0126620 A1 * | 6/2006 | Bonar | .................... | H04W 8/245 370/389 |
| 2008/0002582 A1 * | 1/2008 | Li | .......................... | H04L 47/30 370/328 |

(Continued)

FOREIGN PATENT DOCUMENTS

| | | | | | |
|---|---|---|---|---|---|
| CN | | 113382442 A | * | 9/2021 | ............ H04W 28/22 |
| WO | WO-2023009117 A1 | * | 2/2023 | | ........... H04L 5/0091 |

*Primary Examiner* — Phyllis A Book
(74) *Attorney, Agent, or Firm* — Carter, DeLuca & Farrell LLP

(57)          ABSTRACT

Resource reservation and/or scheduling may take credit-based shaper algorithm/queue behavior, in time sensitive communication, into account. A base station may schedule resources for transmission of time sensitive networking packets based on the state of the credit based shaper queue. The state of the credit based shaper queue may be determined based on real-time credit-based simper assistant information, in an uplink scenario, or output of a simulator of a real-time credit-based shaper queue, in a downlink scenario, or a combination of real-time credit-based shaper assistant information and simulator output.

1 Claim, 10 Drawing Sheets

(56)          References Cited

U.S. PATENT DOCUMENTS

| | | | |
|---|---|---|---|
| 2009/0168790 A1* | 7/2009 | Lee ........................ | H04L 47/39 |
| | | | 370/412 |
| 2011/0103316 A1* | 5/2011 | Ulupinar ................ | H04L 47/50 |
| | | | 370/329 |
| 2011/0116371 A1* | 5/2011 | James .................... | H04L 47/22 |
| | | | 370/230.1 |
| 2013/0088959 A1* | 4/2013 | Kamath .................. | H04L 47/39 |
| | | | 370/235 |
| 2014/0229645 A1* | 8/2014 | Gabbay ................. | G06F 13/364 |
| | | | 710/113 |
| 2014/0269274 A1* | 9/2014 | Banavalikar ............ | H04L 47/39 |
| | | | 370/230 |
| 2015/0296089 A1* | 10/2015 | Subramanian .......... | H04W 8/30 |
| | | | 455/405 |
| 2016/0112896 A1* | 4/2016 | Karampatsis ........... | H04L 47/22 |
| | | | 370/230.1 |
| 2018/0115498 A1* | 4/2018 | Sundaram ............... | H04L 47/39 |
| 2020/0028791 A1* | 1/2020 | McGrath ............... | H04L 41/145 |
| 2021/0075730 A1* | 3/2021 | Palermo .............. | H04L 47/6275 |
| 2021/0209037 A1* | 7/2021 | Sankaran ............ | G06F 13/1673 |
| 2022/0286906 A1* | 9/2022 | Bathwal ................ | H04W 72/21 |
| 2023/0284077 A1* | 9/2023 | Pateromichelakis ... | H04L 47/20 |
| | | | 370/235 |

* cited by examiner

800

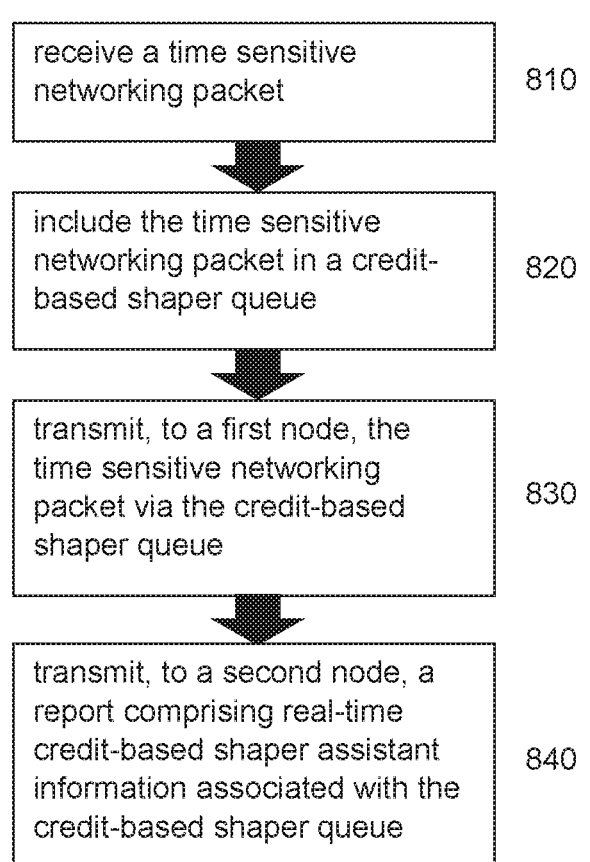

receive a time sensitive
networking packet

810 include the time sensitive
networking packet in a credit-
based shaper queue

820 transmit, to a first node, the
time sensitive networking
packet via the credit-based
shaper queue

830 transmit, to a second node, a
report comprising real-time
credit-based shaper assistant
information associated with the
credit-based shaper queue

900 receive a time sensitive networking packet    910 receive a report comprising real-time credit-based shaper assistant information    920 determine a state of a credit-based shaper queue at a time of receiving the time sensitive networking packet based, at least partially, on the received report    930

1000 receive a time sensitive
networking packet                    1010 receive one or more credit-
based shaper configuration           1020
parameters determine a state of a credit-
based shaper queue at a time
of receiving the time sensitive
networking packet based, at          1030
least partially, on the one or
more received credit-based
shaper configuration
parameters

RAN ENHANCEMENT TAKING INTO ACCOUNT THE CBS BEHAVIOUR IN TSC

RELATED APPLICATION

This application was originally filed as PCT Application No. PCT/CN2021/125568, filed on Oct. 22, 2021, of which priority is claimed and is incorporated herein by reference in its entirety.

TECHNICAL FIELD

The example and non-limiting embodiments relate generally to resource allocation and, more particularly, to resource scheduling in time sensitive communication.

BACKGROUND

It is known, in fully centralized time sensitive networking, for a centralized network configuration entity to perform resource reservation and scheduling.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

In accordance with one aspect, a method comprising: receiving, with a device, a time sensitive networking packet; including the time sensitive networking packet in a credit-based shaper queue; and transmitting, to a network first node, the time sensitive networking packet via the credit-based shaper queue; and transmitting, to a second node, a report comprising real-time credit-based shaper assistant information associated with the credit-based shaper queue.

In accordance with one aspect, an apparatus comprising: at least one processor; and at least one memory including computer program code; the at least one memory and the computer program code configured to, with the at least one processor, cause the apparatus at least to: receive a time sensitive networking packet; receive a report comprising real-time credit-based shaper assistant information; and determine a state of a credit-based shaper queue at a time of receiving the time sensitive networking packet based, at least partially, on the received report.

In accordance with one aspect, an apparatus comprising: at least one processor; and at least one non-transitory memory including computer program code; the at least one memory and the computer program code configured to, with the at least one processor, cause the apparatus at least to: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

In accordance with one aspect, a method comprising: receiving, with a network node, a time sensitive networking packet; receiving a report comprising real-time credit-based shaper assistant information; and determining a state of a credit-based shaper queue at a time of receiving the time sensitive networking packet based, at least partially, on the received report.

In accordance with one aspect, a method comprising: receiving, with a network node, a time sensitive networking packet; receiving one or more credit-based shaper configuration parameters; and determining a state of a credit-based shaper queue at a time of receiving the time sensitive networking packet based, at least partially, on the one or more received credit-based shaper configuration parameters.

In accordance with one aspect, an apparatus comprising means for performing: receiving a time sensitive networking packet; including the time sensitive networking packet in a credit-based shaper queue; transmitting, to a first node, the time sensitive networking packet via the credit-based shaper queue; and transmitting, to a second node, a report comprising real-time credit-based shaper assistant information associated with the credit-based shaper queue.

In accordance with one aspect, an apparatus comprising means for performing: receiving a time sensitive networking packet; receiving a report comprising real-time credit-based shaper assistant information; and determining a state of a credit-based shaper queue at a time of receiving the time sensitive networking packet based, at least partially, on the received report.

In accordance with one aspect, an apparatus comprising means for performing: receiving a time sensitive networking packet; receive one or more credit-based shaper configuration parameters; and determining a state of a credit-based shaper queue at a time of receiving the time sensitive networking packet based, at least partially, on the received one or more credit-based shaper configuration parameters.

In accordance with one aspect, a non-transitory computer-readable medium comprising program instructions stored thereon which, when executed with at least one processor, cause the at least one processor to: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

In accordance with one aspect, a non-transitory computer-readable medium comprising program instructions stored thereon which, when executed with at least one processor, cause the at least one processor to: receive a time sensitive networking packet; receiving a report comprising real-time credit-based shaper assistant information; and determine a state of a credit-based shaper queue at a time of receiving the time sensitive networking packet based, at least partially, on the received report.

In accordance with one aspect, a non-transitory computer-readable medium comprising program instructions stored thereon which, when executed with at least one processor, cause the at least one processor to: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

BRIEF DESCRIPTION OF THE DRAWINGS

The foregoing aspects and other features are explained in the following description, taken in connection with the accompanying drawings, wherein:

FIG. 8 is a flowchart illustrating steps as described herein;

DETAILED DESCRIPTION OF EMBODIMENTS

Figure 1:
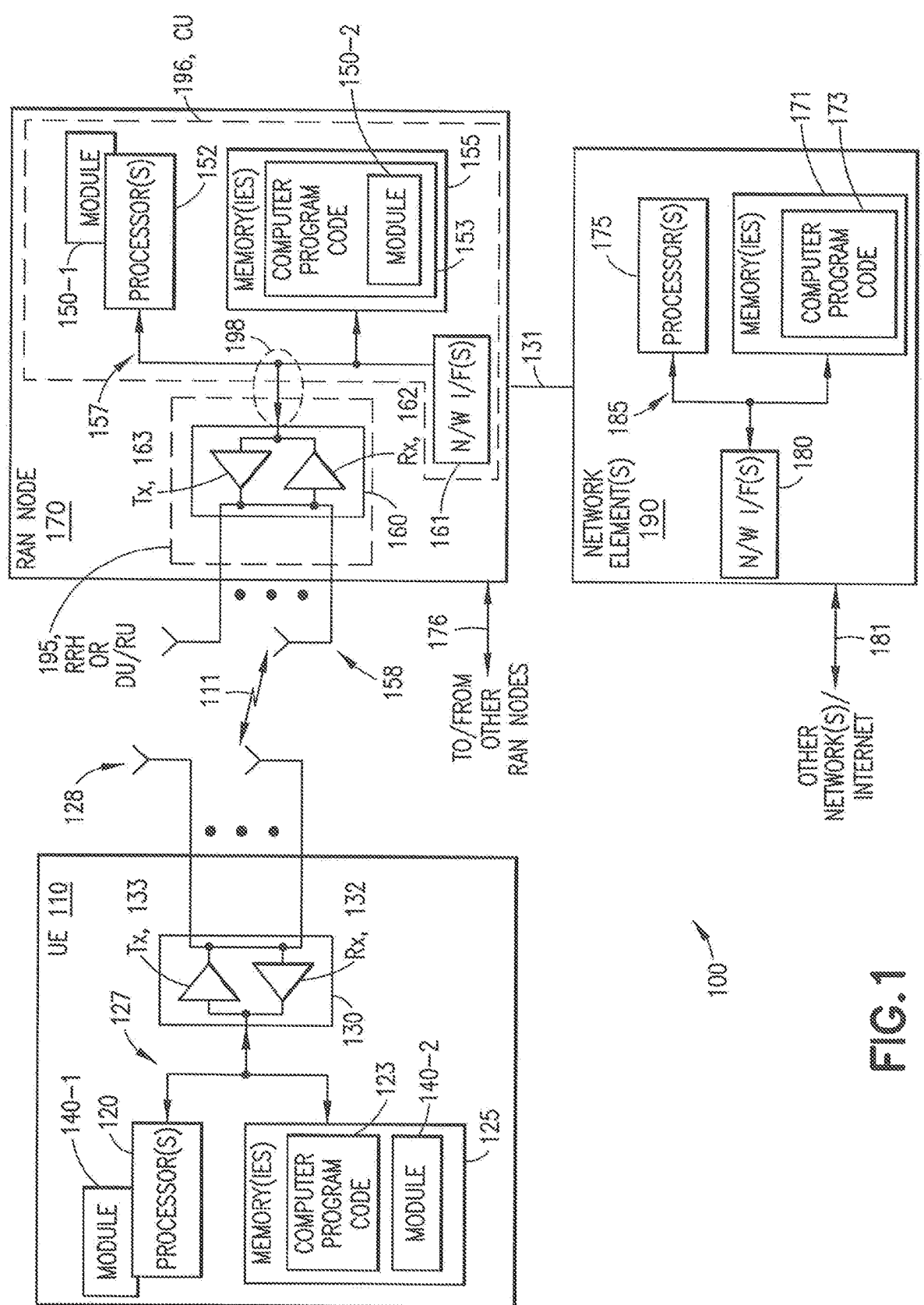
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
5GS 5G system
AMF access and mobility management function
ARQ automatic repeat request
CBS credit-based shaper
CBSAI CBS assistant information
CG configured grant
CNC centralized network configuration
CU central unit
CUC centralized user configuration
DS-TT device-side TSN translator
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
IRT isochronous real-time
L1 layer 1
LTE long term evolution
MAC medium access control
MCS modulation and coding scheme
MME mobility management entity
ng or NG new generation
ng-eNB or NG-eNB new generation eNB
NR new radio
N/W or NW network
NW-TT network-side TSN translator
PDB packet delay budget
PDCP packet data convergence protocol
PHY physical layer
RAN radio access network RF radio frequency
RLC radio link control
RRC radio resource control
RRH remote radio head
RS reference signal
RU radio unit
Rx receiver
SDAP service data adaptation protocol
SGW serving gateway
SMF session management function
TSC time sensitive communication
TSCAI TSC assistant information
TSN time sensitive network
Tx transmitter
UE user equipment (e.g., a wireless, typically mobile device)
UPF user plane function
URLLC ultra-reliable low-latency communication Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s)

(DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to a fully distributed model of time sensitive networking (TSN). 3GPP introduced support for the IEEE Time Sensitive Networking (TSN) fully centralized model in Rel-16, in which deterministic traffic, including Isochronous Real-Time (IRT), is supported in 5G system. In the TSN fully centralized configuration model, each TSN system has a single Centralized Network Configuration (CNC) entity. The CNC provides a centralized means for performing resource reservation, scheduling, and other types of configuration for each of the bridges. A resource reservation process is typically applied across the network elements so as to ensure that there are sufficient resources for processing TSN flows with priority. From the RAN point of view, gNB performs the scheduling for TSN streams based on Time sensitive communication (TSC) Assistant Information (TSCAI) received from the core network control plane.

3GPP Rel-18 or beyond may support a fully distributed model of TSN to extend 5GS with diversified TSN services in the vertical domain. In the fully distributed model, there may be no central controller, and therefore the resources may be reserved in each bridge independently along the data transmission path in a distributed way. In the egress port, credit-based shaper (CBS) may be mandatory for a TSN fully distributed model.

CBS is a queuing algorithm defined by clause 35 of IEEE Std 802.1Q-2018. This shaper outputs packets at a rate that, over a relatively short term, is equal to the total bandwidth allocated to the TSN flows using that queue.

For a given queue that supports credit-based shaper transmission selection, the algorithm may determine that a frame is available for transmission if the following conditions are all true (see IEEE Std 802.1Q-2018, IEEE Standard for Local and Metropolitan Area Networks-Bridges and Bridged Networks): the queue contains one or more frames; and the credit parameter is zero or positive.

The following external parameters may be associated with each queue that supports the operation of the credit-based shaper algorithm:

portTransmitRate—The transmission rate, in bits per second, that the underlying MAC Service (that supports transmission through the Port) may provide. The value of this parameter may be determined by the operation of the MAC.

idleSlope—The rate of change of credit, in bits per second, when the value of credit is increasing. The value of idleSlope can never exceed portTransmitRate.

credit—The transmission credit, in bits, that may currently be available to the queue.

sendSlope—The rate of change of credit, in bits per second, when the value of credit is decreasing. The value of sendSlope may be defined as follows: sendSlope=(idleSlope−portTransmitRate).

The CBS shaper may support different traffic classes. For example, class A (tight delay bound) and class B (loose delay bound) may be configured by default. Each class queue may operate according to the throttling mechanism. When no frame is available in the queue, the credit for the queue may be set to zero. A queue may be eligible for transmission if the credit is non-negative. The credit may be increased by idleSlope when there is at least one frame in the queue, and decreased by sendSlope when a frame is transmitted.

Figure 2:
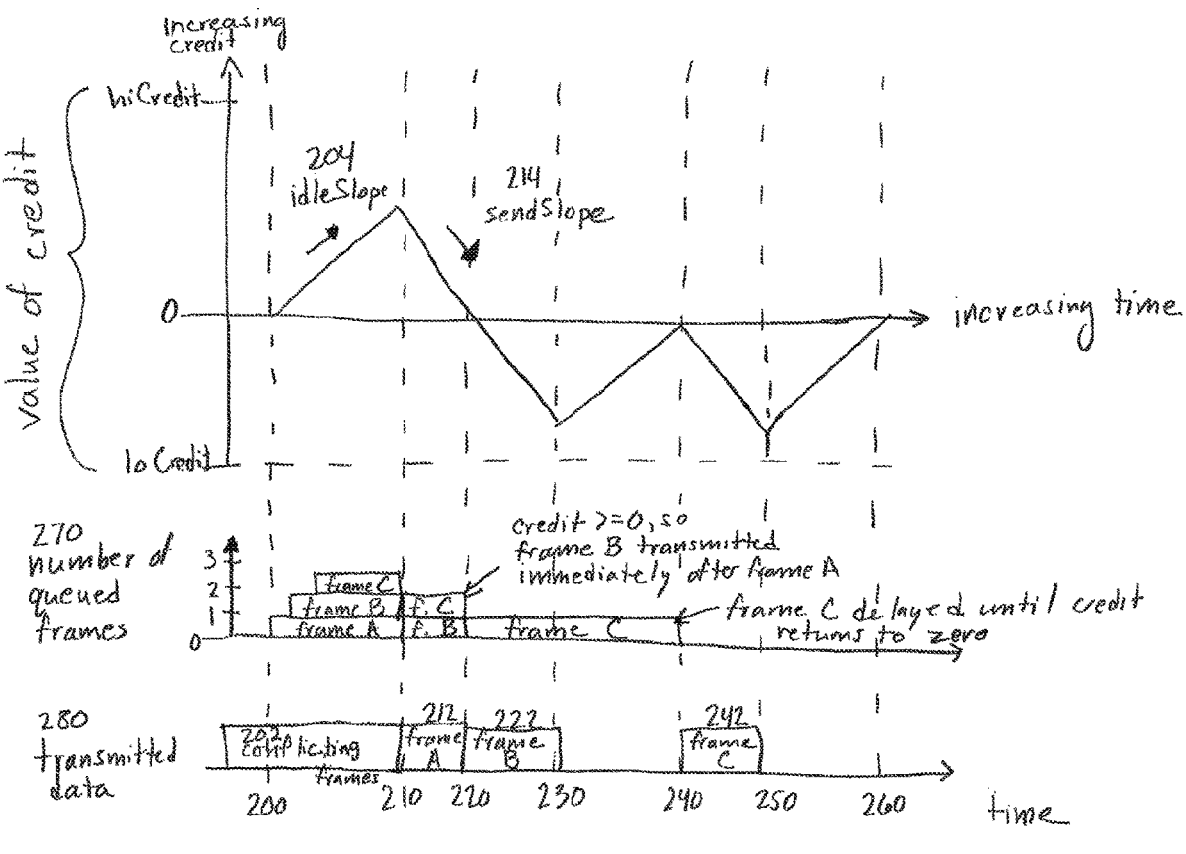
FIG. 2 is a diagram illustrating features as described herein.

Referring now to FIG. 2, illustrated is an example of CBS operation where queued frames are transmitted along with conflicting frames. Frames may comprise MAC frames or packets. In the present disclosure, the terms "frame" and "packet" may be considered interchangeable. The frame(s) or packet(s) may comprise TSN packets. At time 200, there may be no frames queued, and the credit may have a value of 0. Conflicting frames 202 may be transmitted at time 200 (280). Three frames (A, B, C) may be queued (270) while the Port is transmitting conflicting traffic (202 at 280), and credit accumulates at the rate of idleSlope (204). Once the conflicting traffic has been transmitted (at time 210), the first and second frames are transmitted back-to-back, because transmitting the first frame leaves credit≥0. In other words, after frame A (212) is transmitted at time 210 (280), credit decreases according to sendSlope 214. Because credit is not negative at time 220, frame B (222) is also transmitted (280). However, as transmitting the second frame (frame B 222) causes credit to become negative (at time 230), transmission of the third frame (frame C 242) is delayed until credit returns to zero (at time 240). In other words, the frame(s) in the queue 270 remain in the queue 270 until the credit, accumulating according to idleSlope (204), reaches a non-negative value, in this case 0. After transmission of frame C (242) at time 240, credit is negative and there are no further frames in the queue. Credit accumulates according to idleSlope 204 until time 260. Because there are no frames in the queue 270 at time 260, the credit remains at 0.

It should be noted that the example of FIG. 2 is not limiting; other values of idleSlope, sendSlope, contents of the queue, amount of conflicting frames to be transmitted, size of frames to be transmitted, etc. may be different in other examples.

In the fully distributed model of TSN, there is no central controller and, therefore, the resources are reserved in each bridge along the data transmission path in a distributed way.

Due to the limited bandwidth and transmission rate of air interface, the RAN is generally the scheduling bottleneck of the whole 5GS bridges, when compared to the transmission rate and switching rate of wired Ethernet. Especially in heavily loaded scenarios, the radio resource may be reserved or scheduled reasonably based on the maximum tolerable packet delay budget (PDB) in this 5GS bridge.

Figure 3:
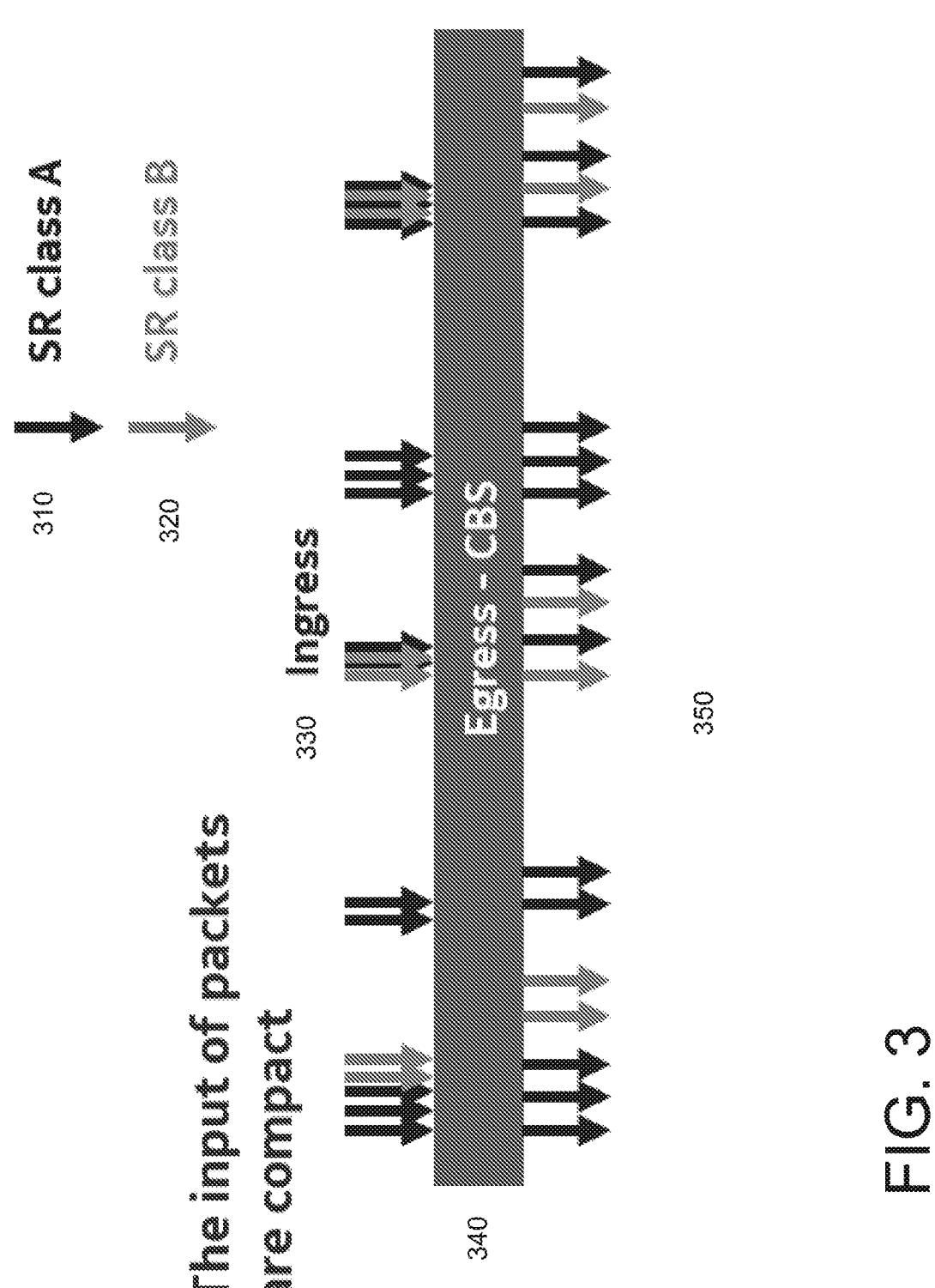
FIG. 3 is a diagram illustrating features as described herein.

Referring now to FIG. 3, illustrated is an example of the shaping effect of CBS. FIG. 3 shows traffic of SR class A (310) and SR class B (320) before and after CBS 330. While the input packets at input/ingress (330) of CBS 340 may be compact or closely grouped, the packets output by the CBS 340 (at 350) may be more evenly spaced. In output/egress port 350 (i.e. after/below CBS 340), the sequence of arrived packets (330) may be transmitted uniformly and match the rate of the total bandwidth allocated to the TSN flows that belong to the same traffic class.

Unlike the TSN fully centralized configuration model, in the fully distributed model, it may be that no CNC entity tells a node of the RAN how many resources should be reserved and when these resources would be scheduled in advance. When the TSN packet is arriving to the RAN, no resources may be reserved (granted) by prior arrangement with gNB.

Based on the definition of CBS algorithm, when the CBS parameters at the egress port (e.g. portTransmitRate, idleSlope, credit, sendSlope) are set, the TSN flows through 5GS bridge may be output in a regular and fixed propagation delay form, for example similar to FIG. 3 at egress/output 350. Therefore, in an example embodiment, the radio resource scheduling gNB for TSC traffic may be adjusted based on/inspired by such regular form of output. In other words, CBS behavior may affect, and even determine, the reservation and scheduling of radio resources in RAN, which may be used for further optimization based on CBS behavior.

From this point of view, new RAN enhancements in Rel-18 or beyond may be tailored by taking into account the CBS behavior. A technical effect of example embodiments of the present disclosure may be to help optimize the radio resource utilization and efficiency.

For performing the scheduling decisions in the gNB, in an example embodiment, egress port(s) may report, to the gNB, real-time information of the CBS queue state(s). For UL traffic, the wired connection from UPF to gNB may help the gNB to obtain real-time CBS queue state in time from the NW-TT (egress point: NW-TT: Network-side TSN Translator) located at the UPF, and its delay may only be at the μsec level.

However, real-time reporting of CBS queue status may not be suitable for the data flows in the opposite direction (i.e. downlink TSC traffic), where the egress port, DS-TT (Device-side TSN Translator), is located in each UE. The delay of the transmission on air interface and the delay of the uplink grant for the reporting may both result in the real-time CBS queue state becoming invalid. Example embodiments of the present disclosure may have the technical effect of avoiding invalidation of "real-time" reporting.

Example embodiments of the present disclosure may avoid real-time reporting on CBS queue status. Example embodiments of the present disclosure may also concern the information delivered to the gNB for the decision-making of smart radio scheduling (i.e. what information is provided for the decision-making of smart radio scheduling).

Example embodiments of the present disclosure may distinguish between the uplink TSC traffic scenario and the downlink TSC traffic scenario.

Example embodiments of the present disclosure may have the technical effect of providing RAN enhancement that takes into account the CBS behavior in TSC.

In an example embodiment, real-time CBS assistant information (CBSAI) may be sent from UPF to gNB, for example for the case of uplink TSC traffic. For the uplink TSC traffic, the CBS is at the egress port on UPF/NW-TT. The CBS may manage the queue(s) which contain the packet(s) that are transmitted by all TSC UE and interfering data. When a packet enters the queue, the time it is transmitted to the next hop may be affected by many factors, for example the queue length, value of credit, parameter of CBS (i.e. idleSlope), and whether there is a conflicting frame currently scheduled. It may be noted that UPF is used as one example for sending CBSAI information; another network entity may additionally or alternatively send such information.

In an example embodiment, for uplink TSC traffic, a dedicated message, for example real-time CBS assistant information (CBSAI), may be sent from UPF/NW-TT to gNB and may be used by the gNB to assist in smart radio scheduling.

In an example embodiment, static CBS configuration parameters may be included in TSCAI which may be calculated and determined by (TSN) AF. These CBS configuration parameters may be sent to the NW-TT/DS-TT. In this example, there may not be UE reporting of the parameters to NW; in other words, the parameters may be received from another module of the network rather than from a UE.

Since the radio scheduler in gNB and the CBS shaper in UPF are connected by wireline, the delay may be negligible, especially considering localized 5GS deployments where both RAN and core network may be deployed in the same industrial premise.

In an example embodiment, the gNB may make a request for the report (including, for example, CBSAI) from UPF/NW-TT. In an example, the request may be triggered by an event, such the gNB receiving the packet from the UE for the first time. Additionally or alternatively, the gNB may find that the time is coming to the CG (configured grant) moment.

In an example embodiment, the UPF/NW-TT may transmit the report(including, for example, CBSAI) periodically in a pre-configured window. In another example embodiment, the transmission of the report may be triggered by a gNB's request, and then sent periodically for a preconfigured time period. In another example embodiment, the report may be transmitted with a predetermined periodicity. In another example embodiment, transmission of the report may be discontinuous; for example, during a certain duration, the report may be transmitted periodically, while during another duration (for example, no packet comes into the queue), the report may not be transmitted.

Figure 4:
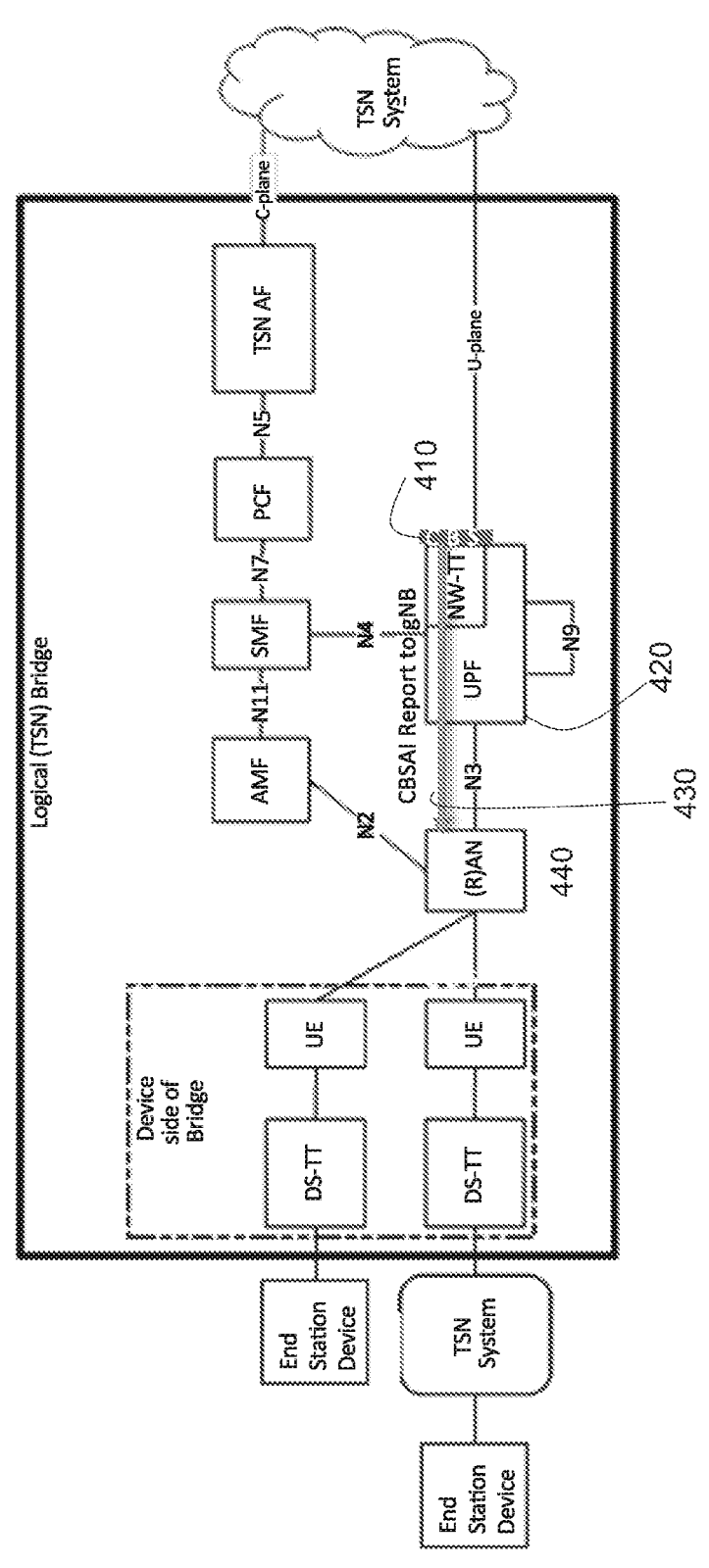
FIG. 4 is a diagram illustrating features as described herein.

Referring now to FIG. 4, illustrated is an example of a logical (TSN) bridge in which CBS (410) is located at the egress port (UPF) (420) for uplink TSC traffic. The CBSAI report (430) may be transmitted to gNB at the (R)AN (440). The CBSAI report (430) may include one or a sequence of the following parameters: number of total packets in queue; value of credit; and estimated time to clear queue.

In an example embodiment, the estimated time to clear queue may be used directly by the gNB for the decision-making of smart radio scheduling. Due to the capability limitation of UPF/NW-TT, if the parameter is not available, the other two parameters of "number of total packets in queue" and "the value of credit" may also be helpful for the gNB to optimize the scheduling.

In an example, once that CBSAI tells/informs the gNB that the queue of the class of this TSN packet may be cleared after, for example, 2 ms, the scheduling for this TSN packet may adopt one or more of the following strategies for the transmission: scheduling strategy may decide that the scheduling time budget may be increased from 0.125 ms to 0.5 ms; originally allowing only 2 retransmissions, with the 0.5 ms time budget, having 4 retransmissions may now be allowed; and/or, under the premise of resource redundancy, the packet may be transmitted directly by repetition four times in a 125 μs slot.

Figure 5:
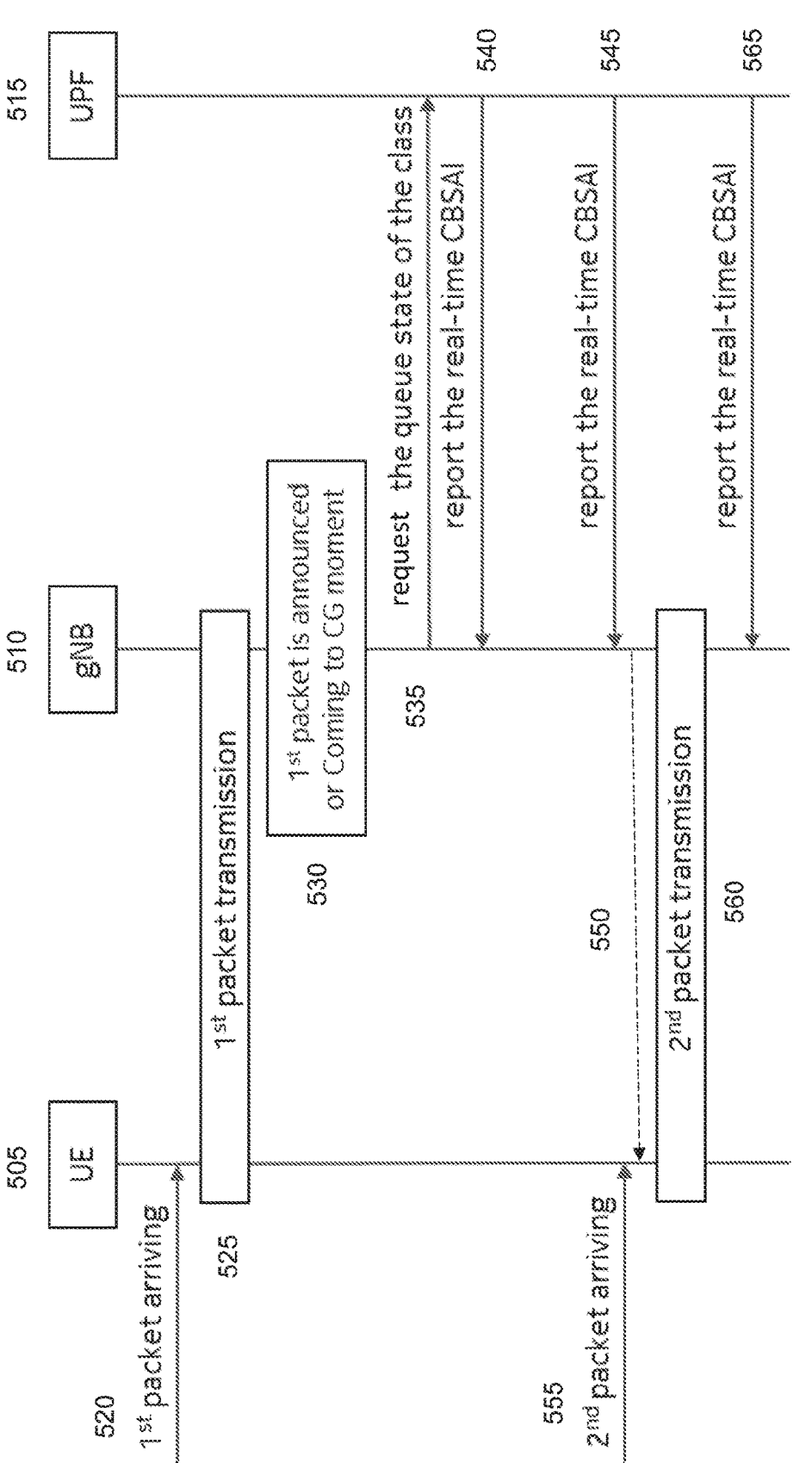
FIG. 5 is a flowchart illustrating steps as described herein.

Referring now to FIG. 5, illustrated is a flowchart showing example steps of a gNB acquiring the UPF report (e.g. CBSAI) in an uplink TSC transmission. UE 505 may receive a 1st packet at 520. The UE 505 may transmit the 1st packet (525) to a gNB 510. At 530, the 1st packet may be received at gNB 510, and gNB 510 may determine to request the queue state of the class of the 1st packet. In other words, receipt of the 1st packet may trigger the gNB to request CBSAI from UPF. At 535, the gNB 510 may request the queue state of the class of the 1st packet from UPF 515. Upon receiving CBSAI from UPF, the gNB may adjust the UL grant for consecutive packets in the same burst. The gNB 510 may transmit the CBSAI request in response to receipt of the 1st packet at 525. At 540, the gNB 510 may receive from the UPF 515 a report of the real-time CBSAI. At 545, the gNB 510 may receive from the UPF 515 another report of the real-time CBSAI. At 555, the UE 505 may receive a 2nd packet. The gNB 510 may become aware of the presence of a packet in the UE 505's UL buffer (i.e. 2nd packet) using TSCAI CBSAI information (e.g. at 545), a buffer status report (BSR) from the UE, or via some other method. After becoming aware of the presence of the packet in the UE's UL buffer, the gNB 510 may provide the UE 505 with a UL grant for transmission, with grant parameters (550), taking into account the real-time CBSAI reported e.g. in step 545. In other words, the gNB 510 may become aware of a traffic property at UE 505. In response to this traffic property, the gNB 510 may adjust the UL grant. In response to receipt of an (adjusted) UL grant, the UE 505 may perform transmission to the gNB 510. In other words, subsequent transmissions by the UE 505 may be affected by real-time CBSAI information. The UE 505 may transmit the 2nd packet (560) to the gNB 510. At 565, the gNB 510 may receive from the UPF 515 another report of the real-time CBSAI.

The 1st and 2nd packet of FIG. 5 may be a TSN packet. The TSN packet may be included in the CBS of a UE before the TSN packet is transmitted to an end station device or a bridge of TSN. In the example of FIG. 5, the gNB 510 may be an end station device or a bridge of TSN. It may be noted that CBS may only be configured in the egress port of the UE 505. Accordingly, when the UE 505 receives a TSN packet and includes it in the CBS, it may only forward the TSN packet outside 5GS.

In an example embodiment, a CBS simulator may be implemented in the gNB based on CBS configured parameters, for example for the case of downlink TSC traffic. For the downlink TSC traffic, the CBS is at the egress port on each UE. The radio scheduler in gNB and the CBS shaper in UE are separated by a wireless interface. Generally, it may be assumed that the CBS queue state will change quickly; accordingly, it may be hard for the gNB to keep up with the state change(s) of the UE.

In an example embodiment, the CBS configured parameters may be carried in TSCAI. In an example embodiment, the CBS parameters may be signaled to the gNB, for example as part of TSCAI information signaled by the core network.

The term "simulator" is not intended to be limiting the scope of example embodiments of the present disclosure; uses of the word "simulator" may be replaced with "emulator," "programming logic," "piece of code," etc. A person of ordinary skill in the art would understand that the term "simulator" may be replaced with any module capable of performing function(s) required for example embodiments of the present disclosure.

In an example embodiment, for the downlink TSC traffic, the gNB may estimate the current state of the CBS at the UE/DS-TT's egress port, for example using a simulator/emulator/logic, where the output of the simulator may be used at the gNB to adjust its scheduling decisions. Because the simulator is in gNB, there may be no or little need for real-time information to be received from the UE. The simulator may operate based on one or more CBS parameters, which may be reported by the UE.

Figure 6:
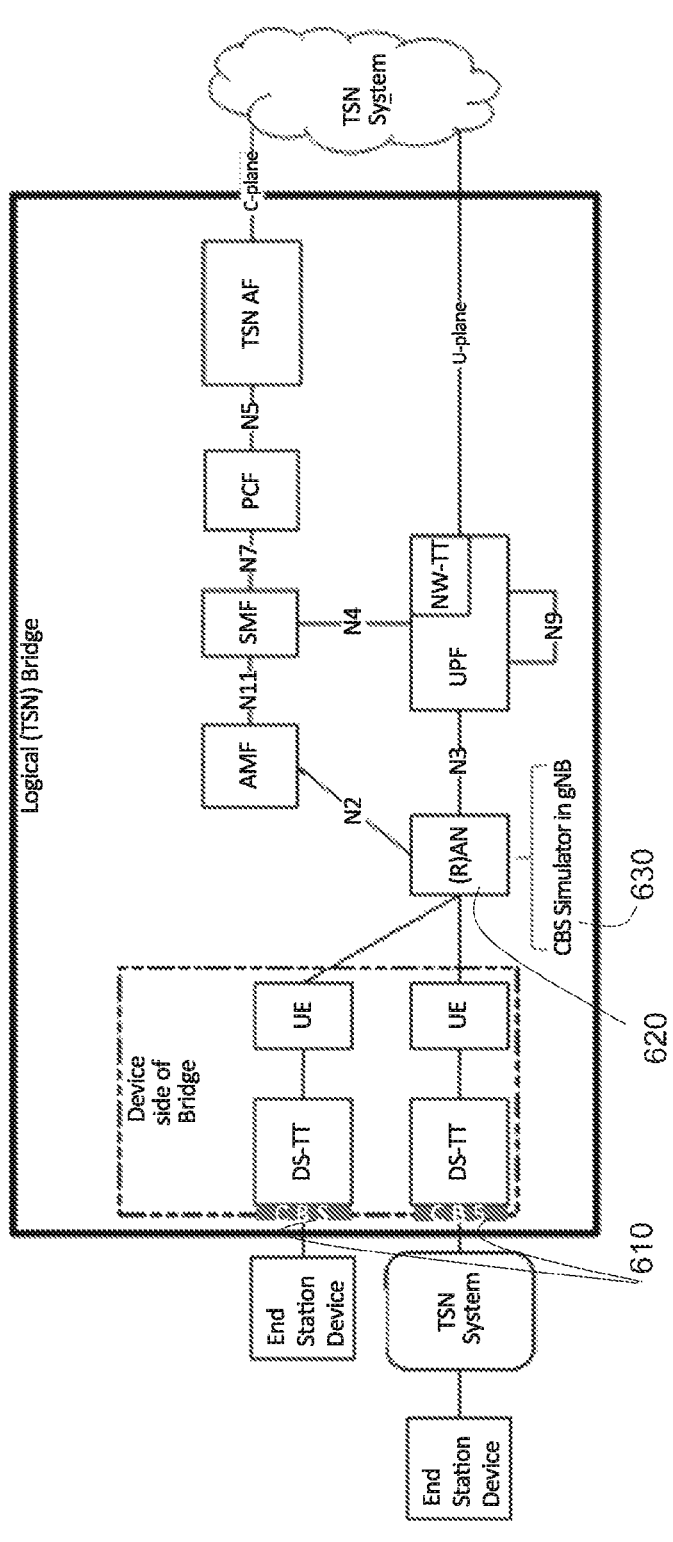
FIG. 6 is a diagram illustrating features as described herein.

Referring now to FIG. 6, illustrated is an example of CBS at the egress port (UE) for downlink TSC traffic. The CBS(s) (610) may be located at the device side of the bridge, for example at DS-TT. From the RAN point of view, the gNB, which may be located at (R)AN 620, performs the scheduling for TSN streams based on CBS parameters from the core network control plane. The CBS configuration parameters may include one or a sequence of the following ones: traffic class or priority; idleSlope; and/or portTransmitRate. In an example embodiment, portTransmitRate may be preconfigured by the OAM.

In an example embodiment, the gNB may use a simulator (630) using as an input the CBS configuration parameters carried in TSCAI. When TSN packets arrive at the gNB, it may use the simulator to estimate the CBS behavior at the egress port. The gNB may determine the scheduling scheme based on the results of simulation prediction.

Figure 7:
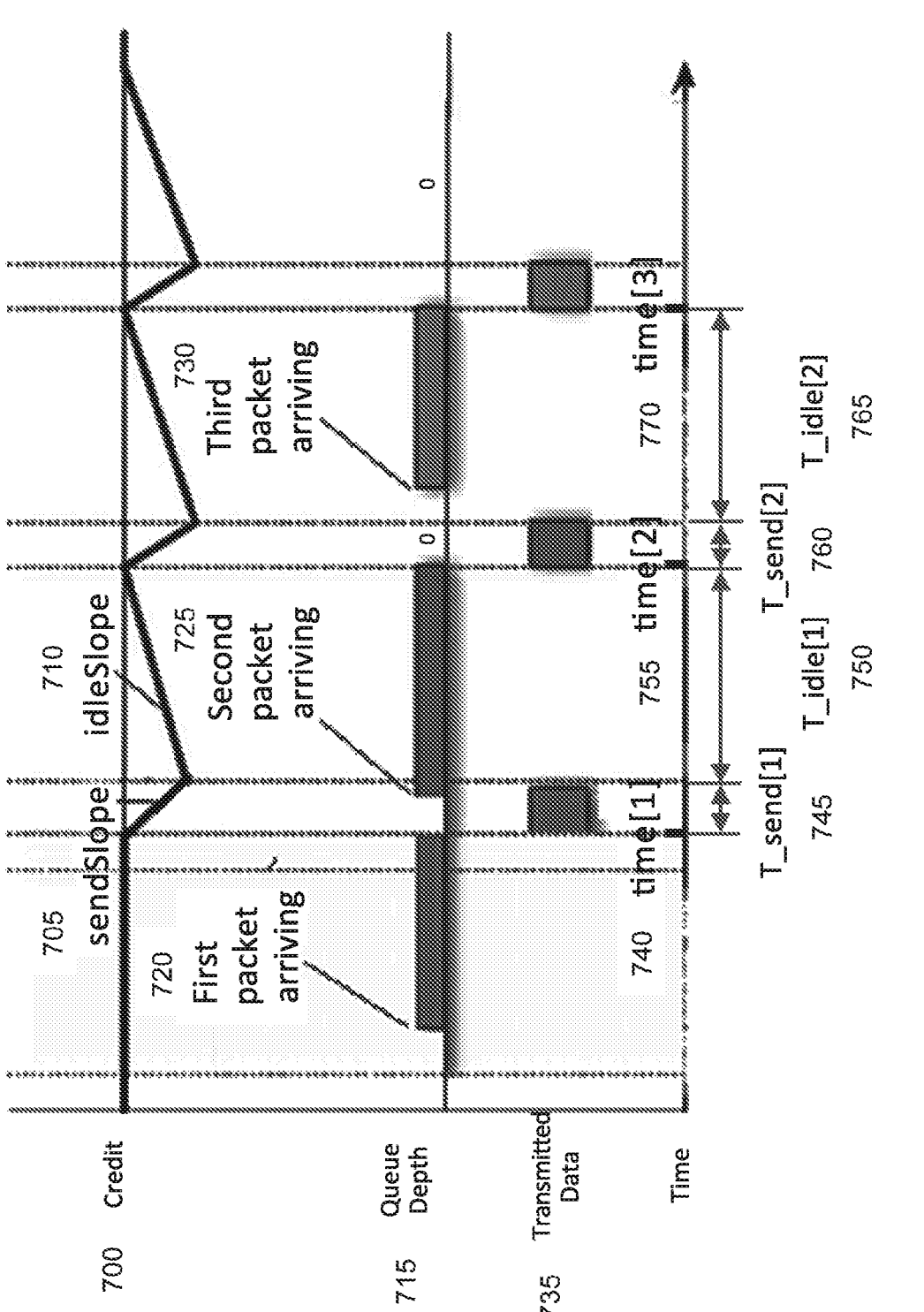
FIG. 7 is a diagram illustrating features as described herein.

In an example, if the simulator (630) in gNB (620) predicts that the time at which the $i^{th}$ packet is to be launched/output on egress is time[x], the scheduling of packets may need to guarantee the correct reception at UE before the time[x]. In other words, the scheduling time on gNB may be at least before (time[x]−propagation delay), as illustrated in FIG. 7. If the time is redundant, the strategies for the transmission of TSN packet(s) on the air interface, described in one or more example embodiments of the present disclosure, may also be used to optimize the resource scheduling. A technical effect of example embodiments of the present disclosure may be that a sequence of packets are uniformly sent over the air interface and match the rate at the egress port of UE, similar to the scenario illustrated in FIG. 3.

Referring now to FIG. 7, illustrated is an example of prediction of the arrival time of a next packet. Prediction may be performed via a simulator operating in a gNB, according to an example embodiment of the present disclosure. A first packet (720) may arrive in the queue (715). The first packet (720) may be transmitted via egress at time[1] (740). The credit (700) may decline according to the sendSlope 705 during time period T_send[1] (745). A second packet (725) may arrive in the queue (715). The credit (700) may accumulate according to idleSlope (710) until the credit (700) reaches 0, over time period T_idle[1] (750). Then, at time time[2] (755), the second packet (725) may be transmitted via egress during time period T_send[2] (760). The credit (700) may decline according to the sendSlope 705 during time period T_send[2] (760). A third packet (730) may arrive in the queue (715). The credit (700) may accumulate according to idleSlope (710) until the credit (700) reaches 0, over time period T_idle[2] (765). Then, at time time[3] (770), the third packet (730) may be transmitted via egress. FIG. 7 illustrates the overall view of the CBS on egress, including the packet arriving, launching, credit and the time.

In an example embodiment, the CBS simulator in gNB may treat the traffic of each class of one UE independently. In an example embodiment, the CBS simulator may only focus on the packets in a burst of its own class. In an example embodiment, the credit before the first packet arrives may be 0. In an example embodiment, the procedure of the simulator may be as follows:

```
const IdleSlope: integer; //define the rate of change of credit
const burstsize: integer; //deifne the number of the packet in
burst
begin
    var time[1: burstSize]: integer;      //define the time packet
would be launched on engress
    var size[1: burstSize]: integer;      //define the size of the
packet arrived to gNB
    var i: integer;
    i:= 1;
    while size[i] > 0 do   // 1st packet arrives to gNB
    begin
        time[i]:= the scheduling time + propagation delay;
    end
    i++;
    while i < burstSize do
    begin
        if size[i] > 0 then // ith packet arrives to gNB
        begin
            time[i]:= time[i−1] + size[i−1] / IdleSlope;
            i++;
        end
    end
end
```

In an example embodiment, the scheduling of packets may be configured to guarantee correct reception at the UE before the time[x], i.e. the scheduling time on gNB may be at least before (time[x]−propagation delay).

In an example embodiment, the CBS simulation in the gNB may use a formula to calculate the time at which the $i^{th}$ packet would be launched/output on egress from the CBS, for example: time[i]:=time[i−1]+size[i−1]/IdleSlope As noted above, the following parameters may be associated with each queue that supports the operation of the credit-based shaper algorithm: portTransmitRate—the transmission rate, in bits per second; idleSlope—the rate of change of credit, in bits per second; credit—the transmission credit, in bits; and/or sendSlope—the rate of change of credit. The value of sendSlope may be defined as follows: sendSlope=(idleSlope−portTransmitRate)

T_send may be defined as the time that the current queue occupies the port to transmit packets. T_idle may be defined as the time that the current queue released the port. The deduction of the delay of the next packet to be launched may be determined as follows:

$$T\_send = Size_{packet}/portTransmitRate$$

$$Credit = sendSlope * T\_send$$

$$= sendSlope * Size_{packet}/portTransmitRate$$

$$Delay[i] = time[i] − time[i − 1]$$

$$= T\_send[i − t] + T\_idle[i − 1]$$

$$= Credit[i − t]/sendSlope + Credit[i − 1]/(−idleSlope)$$

$$= Credit[i − t] * (−idleSlope+sendSlope)/(−idleSlope * sendSlope)$$

$$= Credit[i − 1] * (−portTransmitRate)/(−idleSlope * sendSlope)$$

$$= size[i − 1]/idleSlope$$

$$\therefore time[i] = time[i − 1] + size[i − 1]/idleSlope$$

In an example embodiment, a CBS simulator may be implemented in the gNB, for example for the case of uplink TSC traffic. The simulator may be executed in the gNB to simulate the real-time CBS behaviour of the egress on UPF, and may be used by the gNB to assist in smart radio scheduling. In an example, the initial CBS queue state at the moment of first packet of one burst arriving may affect the whole latency of the burst; in an example embodiment, a CBS simulator may be implemented in the gNB, and real-time CBSAI may be sent to the gNB. Firstly, the gNB may acquire the real-time CBS assistant information at the moment of the first TSN packet arriving. Then, the gNB may integrate the initial CBS queue state with the output of the CBS simulator. Based on the integration/combination, the gNB may determine the radio resource scheduling for the subsequent TSN packet(s). This example embodiment may not need every TSN packet to pay attention to the feedback of real time CBS queue state. In other words, some of the TSN packet scheduling may not be based on the CBSAI, but only on the simulator. A technical effect of this example embodiment may be to reduce the frequency of sending CBSAI from UPF to gNB.

In combination with one or more example embodiments of the present disclosure, scheduling optimization(s) may be performed at the gNB, including but not limited to adjusting the scheduling priority and/or scheduling time budget. For example, packets belonging to a traffic class with a longer queue may be treated by the gNB with/as having lower priority, or the gNB may relax the associated latency/time scheduling budget, since the packets may stall at the egress port anyway. As commonly known from recent URLLC-related studies, more relaxed latency requirements may generally result in increased spectral efficiency, as the gNB may, for example, use a higher modulation and coding scheme (MCS) and multiple hybrid ARQ retransmissions to transmit the packet over the air interface.

FIG. 8 illustrates the potential steps of an example method 800. The example method 800 may include: receiving a time sensitive networking packet, 810; including the time sensitive networking packet in a credit-based shaper queue, 820; transmitting, to a first node, the time sensitive networking packet via the credit-based shaper queue, 830; and transmitting, to a second node, a report comprising real-time credit-based shaper assistant information associated with the credit-based shaper queue, 840. The example method 800 may be performed, for example, with a UE or a UPF. The first node may be an end station device or a bridge of TSN. The second node may be a gNB, a node of NW of 5GS, or a UPF. Additionally or alternatively, the first node and the second node may be the same node. The report may be used by the second node to compare and align the CBS state of the UE (or UPF) with the CBS state predicted by a simulator of the gNB.

Figure 9:
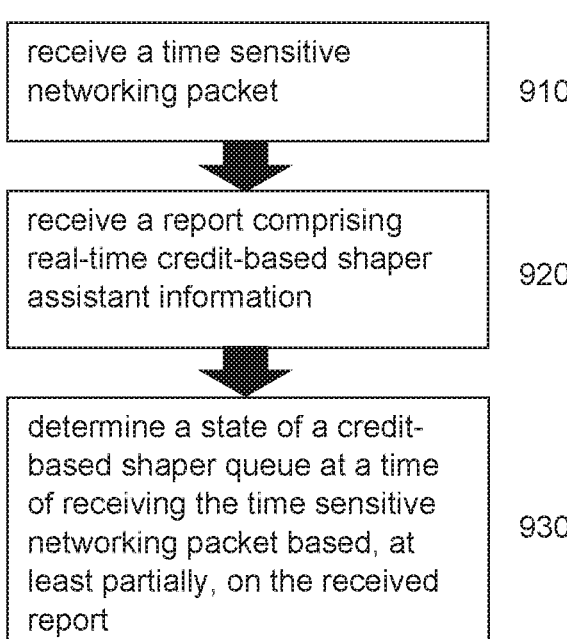
FIG. 9 is a flowchart illustrating steps as described herein.

FIG. 9 illustrates the potential steps of an example method 900. The example method 900 may include: receiving a time sensitive networking packet, 910; receiving a report comprising real-time credit-based shaper assistant information, 920; and determining a state of a credit-based shaper queue at a time of receiving the time sensitive networking packet based, at least partially, on the received report, 930. The example method 900 may be performed, for example, with a base station, network node, or a gNB.

Figure 10:
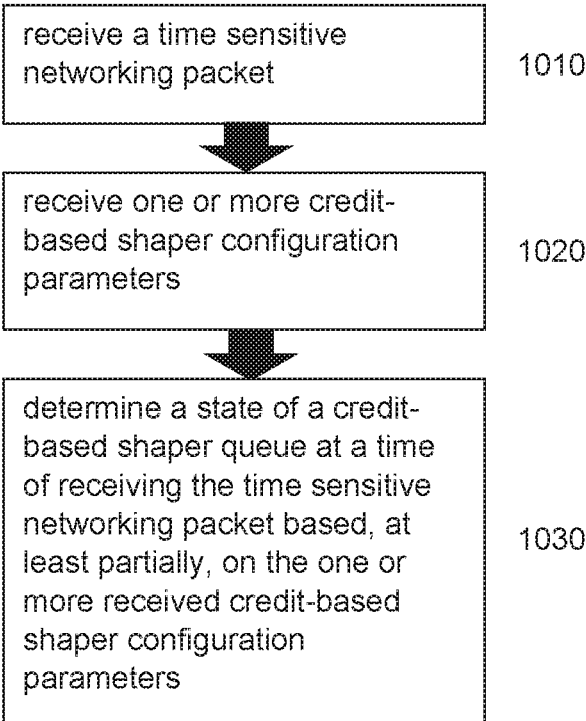
FIG. 10 is a flowchart illustrating steps as described herein.

FIG. 10 illustrates the potential steps of an example method 1000. The example method 1000 may include: receiving a time sensitive networking packet, 1010; receiving one or more credit-based shaper configuration parameters, 1020; and determining a state of a credit-based shaper queue at a time of receiving the time sensitive networking packet based, at least partially, on the one or more received credit-based shaper configuration parameters, 1030. The example method 900 may be performed, for example, with a base station, network node, or a gNB.

In accordance with one example embodiment, an apparatus may comprise: at least one processor; and at least one memory including computer program code; the at least one memory and the computer program code configured to, with the at least one processor, cause the apparatus at least to: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

Transmitting the report may comprise at least one of: transmitting the report periodically within a predetermined period of time, transmitting the report aperiodically, or transmitting the report with a predetermined periodicity.

The example apparatus may be further configured to: receive a request to transmit the report, wherein transmitting the report comprises transmitting the report in response to the request, determine occurrence of an event, wherein transmitting the report comprises transmitting the report in response to the determined event, or transmit the report in a periodic manner.

The real-time credit-based shaper assistant information may comprise at least one of: a total number of packets in the credit-based shaper queue, a value of a credit parameter of the credit-based shaper queue, or an estimated time to clear the credit-based shaper queue.

The apparatus may comprise at least one of: a user equipment, a device-side time sensitive networking translator located at the user equipment, a user plane function, or a network-side time sensitive networking translator located at a user plane function.

The example apparatus may be further configured to: receive a scheduling for one or more resources for the transmission of the time sensitive network packet.

The one or more resources may be scheduled for uplink time sensitive communication.

The one or more resources may be scheduled for downlink time sensitive communication.

The example apparatus may be further configured to: transmit, to the second node, one or more credit-based shaper configuration parameters.

The one or more credit-based shaper configuration parameters may comprise at least one of: a traffic class of the credit-based shaper queue, a priority of the credit-based shaper queue, an indication of a rate at which the value of the credit parameter increases while frames in the credit-based shaper queue are not being transmitted, or an indication of a rate at which frames in the credit-based shaper queue are transmitted.

In accordance with one aspect, an example method may be provided comprising: receiving, with a device, a time sensitive networking packet; including the time sensitive networking packet in a credit-based shaper queue; transmitting, to a first node, the time sensitive networking packet via the credit-based shaper queue; and transmitting, to a second node, a report comprising real-time credit-based shaper assistant information associated with the credit-based shaper queue.

The transmitting of the report may comprise at least one of: transmitting the report periodically within a predetermined period of time, transmitting the report aperiodically, or transmitting the report with a predetermined periodicity.

The example method may further comprise: receiving a request to transmit the report, wherein the transmitting of the report may comprise transmitting the report in response to the request, determining occurrence of an event, wherein the transmitting of the report may comprise transmitting the report in response to the determined event, or transmitting the report in a periodic manner.

The real-time credit-based shaper assistant information may comprise at least one of: a total number of packets in the credit-based shaper queue, a value of a credit parameter of the credit-based shaper queue, or an estimated time to clear the credit-based shaper queue.

The device may comprise at least one of: a user equipment, a device-side time sensitive networking translator at the user equipment, a user plane function, or a network-side time sensitive networking translator located at the user plane function.

The example method may further comprise: receiving a scheduling for one or more resources for the transmission of the time sensitive networking packet.

The one or more resources may be scheduled for uplink time sensitive communication.

The one or more resources may be scheduled for downlink time sensitive communication.

The example method may further comprise: transmitting, to the second node, one or more credit-based shaper configuration parameters.

The one or more credit-based shaper configuration parameters may comprise at least one of: a traffic class of the credit-based shaper queue, a priority of the credit-based shaper queue, an indication of a rate at which the value of the credit parameter increases while frames in the credit-based shaper queue are not being transmitted, or an indication of a rate at which frames in the credit-based shaper queue are transmitted.

In accordance with one example embodiment, an apparatus may comprise: circuitry configured to: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

In accordance with one example embodiment, an apparatus may comprise: processing circuitry; memory circuitry including computer program code, the memory circuitry and the computer program code configured to, with the processing circuitry, enable the apparatus to: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for "operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise: at least one processor; and at least one memory including computer program code; the at least one memory and the computer program code configured to, with the at least one processor, cause the apparatus at least to: receive a time sensitive networking packet; receive a report comprising real-time credit-based shaper assistant information; and determine a state of a credit-based shaper queue at a time of receiving the time sensitive networking packet based, at least partially, on the received report.

In accordance with one example embodiment, an apparatus may comprise: circuitry configured to: receive a time sensitive networking packet; receive a report comprising real-time credit-based shaper assistant information; and determine a state of a credit-based shaper queue at a time of receiving the time sensitive networking packet based, at least partially, on the received report.

In accordance with one example embodiment, an apparatus may comprise: processing circuitry; memory circuitry including computer program code, the memory circuitry and the computer program code configured to, with the processing circuitry, enable the apparatus to: receive a time sensitive networking packet; receive a report comprising real-time credit-based shaper assistant information; and determine a state of a credit-based shaper queue at a time of receiving the time sensitive networking packet based, at least partially, on the received report.

In accordance with one example embodiment, an apparatus may comprise: at least one processor; and at least one memory including computer program code; the at least one memory and the computer program code configured to, with the at least one processor, cause the apparatus at least to: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

In accordance with one example embodiment, an apparatus may comprise: circuitry configured to: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

In accordance with one example embodiment, an apparatus may comprise: processing circuitry; memory circuitry including computer program code, the memory circuitry and the computer program code configured to, with the processing circuitry, enable the apparatus to: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

In accordance with one aspect, an example method may be provided comprising: receiving, with a network node, a time sensitive networking packet; receiving a report comprising real-time credit-based shaper assistant information; and determining a state of a credit-based shaper queue at a time of receiving the time sensitive networking packet based, at least partially, on the received report.

The receiving of the report may comprise receiving the report from at least one of: a user plane function, network-side time sensitive networking translator located at the user plane function, a user equipment, or a device-side time sensitive networking translator located at the user equipment.

The example method may further comprise: requesting the report, wherein the requesting of the report may be based on at least one of: receipt of the time sensitive networking packet, or a determination of an upcoming configured grant moment.

The receiving of the report may comprise at least one of: receiving the report periodically within a predetermined period of time, receiving the report aperiodically, or receiving the report with a predetermined periodicity.

The real-time credit-based shaper assistant information may comprise at least one of: a total number of packets in the credit-based shaper queue, a value of a credit parameter of the credit-based shaper queue, or an estimated time to clear the credit-based shaper queue.

The example method may further comprise: scheduling one or more resources based, at least partially, on the determined state of the credit-based shaper queue, wherein the scheduling of the one or more resources may be based, at least partially, on the real-time credit-based shaper assistant information.

The example method may further comprise: scheduling one or more resources based, at least partially, on the determined state of the credit-based shaper queue, wherein the scheduled one or more resources may be configured for at least one of uplink or downlink time sensitive communication.

In accordance with one aspect, an example method may be provided comprising: receiving, with a network node, a time sensitive networking packet; receiving one or more credit-based shaper configuration parameters; and determining a state of a credit-based shaper queue at a time of receiving the time sensitive networking packet based, at least partially, on the one or more received credit-based shaper configuration parameters.

The determining of the state of the credit-based shaper queue may comprise: estimating the state of the credit-based shaper queue based, at least partially, on the one or more received credit-based shaper configuration parameters.

The one or more credit-based shaper configuration parameters may comprise at least one of: a traffic class of the credit-based shaper queue, a priority of the credit-based shaper queue, an indication of a rate at which the value of the credit parameter increases while frames in the credit-based shaper queue are not being transmitted, or an indication of a rate at which frames in the credit-based shaper queue are transmitted.

The example method may further comprise: receiving a further time sensitive networking packet, wherein the state of the credit-based shaper queue may be estimated further based, at least partially, on a previous time sensitive networking packet.

Estimating the state of the credit-based shaper queue may be based on at least one of: a simulator, an emulator, or logic associated with a real-time state of a credit-based shaper queue.

The at least one of the simulator, the emulator, or the logic may be located at the network node.

The determining of the state of the credit-based shaper queue may comprise determining the state based, at least partially, on an initial state of the credit-based shaper queue.

The example method may further comprise: scheduling one or more resources based, at least partially, on the determined state of the credit-based shaper queue, wherein the scheduled one or more resources may be configured for at least one of downlink or uplink time sensitive communication.

The scheduling of the one or more resources may comprise scheduling the one or more resources for transmission of at least one subsequent time sensitive networking packet.

The time sensitive networking packet and the at least one subsequent time sensitive networking packet may belong to a same traffic class, wherein the scheduling of the one or more resources may comprise at least one of: adjusting a scheduling priority of the traffic class, adjusting a scheduling time budget of the traffic class, or adjusting a number of allowed retransmissions for the traffic class.

In accordance with one example embodiment, an apparatus may comprise means for performing: receiving a time sensitive networking packet; including the time sensitive networking packet in a credit-based shaper queue; transmitting, to a first node, the time sensitive networking packet via the credit-based shaper queue; and transmitting, to a second node, a report comprising real-time credit-based shaper assistant information associated with the credit-based shaper queue.

In accordance with one example embodiment, an apparatus may comprise means for performing: receiving a time sensitive networking packet; receiving a report comprising real-time credit-based shaper assistant information; and determining a state of a credit-based shaper queue at a time of receiving the time sensitive networking packet based, at least partially, on the received report.

In accordance with one example embodiment, an apparatus may comprise means for performing: receiving a time sensitive networking packet; receive one or more credit-based shaper configuration parameters; and determining a state of a credit-based shaper queue at a time of receiving the time sensitive networking packet based, at least partially, on the received one or more credit-based shaper configuration parameters.

In accordance with one example embodiment, a non-transitory computer-readable medium comprising program instructions stored thereon which, when executed with at least one processor, cause the at least one processor to: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

In accordance with another example embodiment, a non-transitory program storage device readable by a machine may be provided, tangibly embodying a program of instructions executable by the machine for performing operations, the operations comprising: receive a time sensitive networking packet; include the time sensitive networking packet in a credit-based shaper queue; transmit, to a first node, the time sensitive networking packet via the credit-based shaper queue; and transmit, to a second node, a report comprising real-time credit-based shaper assistant information associated with the credit-based shaper queue.

In accordance with one example embodiment, a non-transitory computer-readable medium comprising program instructions stored thereon which, when executed with at least one processor, cause the at least one processor to: receive a time sensitive networking packet; receiving a report comprising real-time credit-based shaper assistant information; and determine a state of a credit-based shaper queue at a time of receiving the time sensitive networking packet based, at least partially, on the received report.

In accordance with another example embodiment, a non-transitory program storage device readable by a machine may be provided, tangibly embodying a program of instructions executable by the machine for performing operations, the operations comprising: receive a time sensitive networking packet; receiving a report comprising real-time credit-based shaper assistant information; and determine a state of a credit-based shaper queue at a time of receiving the time sensitive networking packet based, at least partially, on the received report.

In accordance with one example embodiment, a non-transitory computer-readable medium comprising program instructions stored thereon which, when executed with at least one processor, cause the at least one processor to: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

In accordance with another example embodiment, a non-transitory program storage device readable by a machine may be provided, tangibly embodying a program of instructions executable by the machine for performing operations, the operations comprising: receive a time sensitive networking packet; receive one or more credit-based shaper configuration parameters; and determine a state of a credit-based shaper queue at a time of receiving the time sensitive networking packet based, at least partially, on the one or more received credit-based shaper configuration parameters.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:
1. An apparatus comprising:
at least one processor; and
at least one non-transitory memory including computer program code;
the at least one memory and the computer program code configured to, with the at least one processor, cause the apparatus at least to:
receive a time sensitive networking packet;
include the time sensitive networking packet in a credit-based shaper queue;
transmit, to a first node, the time sensitive networking packet via the credit-based shaper queue;

transmit, to a second node, a report comprising real-time credit-based shaper assistant information associated with the credit-based shaper queue, wherein the transmitting the report comprises:

transmitting the report periodically within a predetermined period of time, transmitting the report aperiodically, or transmitting the report with a predetermined periodicity;

receive one or more resources scheduled for the transmission of the time sensitive network packet;

transmit, to the second node, one or more credit-based shaper configuration parameters;

based on receiving a request to transmit the report, transmitting the report in response to the request;

based on occurrence of an event, transmitting the report in response to the determined event, wherein the real-time credit-based shaper assistant information comprises:

a total number of packets in the credit-based shaper queue, a value of a credit parameter of the credit-based shaper queue, and an estimated time to clear the credit-based shaper queue, wherein the apparatus further comprises: a user equipment, a device-side time sensitive networking translator located at the user equipment, a user plane function, and a network-side time sensitive networking translator located at a user plane function, wherein the one or more resources is scheduled for uplink time sensitive communication, and wherein the one or more credit-based shaper configuration parameters comprises:

a traffic class of the credit-based shaper queue, a priority of the credit-based shaper queue, a rate at which the value of the credit parameter increases while frames in the credit-based shaper queue are not being transmitted, and a rate at which frames in the credit-based shaper queue are transmitted.

* * * * *